United States Patent
Ho

(10) Patent No.: US 12,160,410 B2
(45) Date of Patent: Dec. 3, 2024

(54) ELECTRONIC DEVICE AND DATA TRANSMISSION METHOD THEREOF

(71) Applicant: Winbond Electronics Corp., Taichung (TW)

(72) Inventor: Wen-Chiao Ho, Taichung (TW)

(73) Assignee: Winbond Electronics Corp., Taichung (TW)

( * ) Notice: Subject to any disclaimer, the term of this patent is extended or adjusted under 35 U.S.C. 154(b) by 219 days.

(21) Appl. No.: 17/878,074

(22) Filed: Aug. 1, 2022

(65) Prior Publication Data

US 2024/0039901 A1 Feb. 1, 2024

(51) Int. Cl.
*H04L 9/40* (2022.01)

(52) U.S. Cl.
CPC .................. *H04L 63/0485* (2013.01)

(58) Field of Classification Search
CPC ...................................... H04L 63/0485
USPC ......................................... 713/193
See application file for complete search history.

(56) References Cited

U.S. PATENT DOCUMENTS

| | | | | |
|---|---|---|---|---|
| 2003/0217273 A1* | 11/2003 | McGrath | ......... | G11B 20/00086 713/176 |
| 2011/0007897 A1* | 1/2011 | Kodama | ......... | H04L 12/40013 380/255 |
| 2011/0188652 A1* | 8/2011 | Yamaguchi | ...... | H04N 21/23476 380/210 |
| 2020/0250327 A1* | 8/2020 | Naraidoo | ............ | G06F 11/1464 |
| 2021/0367754 A1* | 11/2021 | Madec | ................ | G06F 13/4009 |
| 2022/0045993 A1* | 2/2022 | Kashiwagi | .......... | H04L 63/0442 |
| 2023/0259641 A1* | 8/2023 | Lee | ..................... | G06F 21/6218 726/26 |

FOREIGN PATENT DOCUMENTS

| | | |
|---|---|---|
| CN | 100543761 | 9/2009 |
| CN | 104091100 | 2/2017 |
| CN | 105637520 | 10/2019 |
| CN | 112231777 | 1/2021 |
| CN | 112560121 | 3/2021 |
| TW | I249666 | 2/2006 |
| WO | 2020098327 | 5/2020 |

OTHER PUBLICATIONS

"Office Action of Taiwan Counterpart Application", issued on Aug. 19, 2022, p. 1-p. 10.

* cited by examiner

Primary Examiner — Michael S McNally
(74) Attorney, Agent, or Firm — JCIPRNET

(57) ABSTRACT

An electronic device and a data transmission method thereof are provided. The data transmission method includes: setting dummy data having multiple dummy bits; inserting the dummy bits of the dummy data into transmission data according to an insertion type to generate encryption data; and transmitting the encryption data to a memory device.

18 Claims, 5 Drawing Sheets

```
┌─────────────────────────────────────────────────┐
│ Set dummy data having multiple dummy bits       │──── S610
└─────────────────────────────────────────────────┘
                        │
                        ▼
┌─────────────────────────────────────────────────┐
│ Insert the dummy bits of the dummy data into    │
│ transmission data according to an insertion type│──── S620
│ to generate encryption data                     │
└─────────────────────────────────────────────────┘
                        │
                        ▼
┌─────────────────────────────────────────────────┐
│ Transmit the encryption data to a memory device │──── S630
└─────────────────────────────────────────────────┘
```

ELECTRONIC DEVICE AND DATA TRANSMISSION METHOD THEREOF

BACKGROUND

Technical Field

The disclosure relates to an electronic device and a data transmission method thereof, and in particular to a data transmission method of an electronic device that can ensure data security.

Description of Related Art

In order to ensure that data will not be stolen, an encryption mechanism is often configured in a data transmission action between a controller and a memory device. In the prior art, the controller may perform complex encryption operations on transmission data and information serving as a key to obtain encryption data. Such encryption method requires a receiving end to use the information serving as the key to perform an inverse operation on the encryption data to restore the transmission data.

In addition, the conventional technology may also use an authentication manner of a digital signature to enable the receiving end to confirm whether the received transmission data is correct and unaltered data. However, such manner cannot encrypt the transmitted transmission data and cannot prevent the transmission data from being stolen. In addition, an authentication action of the digital signature also needs to be performed by an algorithm with a certain degree of complexity, so the complexity of the hardware is increased and the required power consumption is increased.

Based on the above, how to design an encryption mechanism that can ensure the security of transmission data without requiring an excessively complex algorithm and hardware circuit has become an important topic for designers in the art.

SUMMARY

The disclosure provides an electronic device and a data transmission method, which can reduce the complexity of encryption operation and ensure the security of data transmission.

The data transmission method of the disclosure includes the following steps. Dummy data having multiple dummy bits is set. The dummy bits of the dummy data are inserted into transmission data according to an insertion type to generate encryption data. The encryption data is transmitted to a memory device.

The electronic device of the disclosure includes a memory device and a controller. The controller is coupled to the electronic device. The controller is used to set dummy data having multiple dummy bits; insert the dummy bits of the dummy data into transmission data according to an insertion type to generate encryption data; and transmit the encryption data to the memory device.

Based on the above, the controller of the electronic device of the disclosure generates the encryption data through inserting the dummy bits of the dummy data into the transmission data according to the insertion type. The complexity of generating the encryption data can be effectively reduced, and the transmission data can be prevented from being stolen during a transmission process to effectively ensure the security of the transmission data.

DETAILED DESCRIPTION OF DISCLOSED EMBODIMENTS

Figure 1:
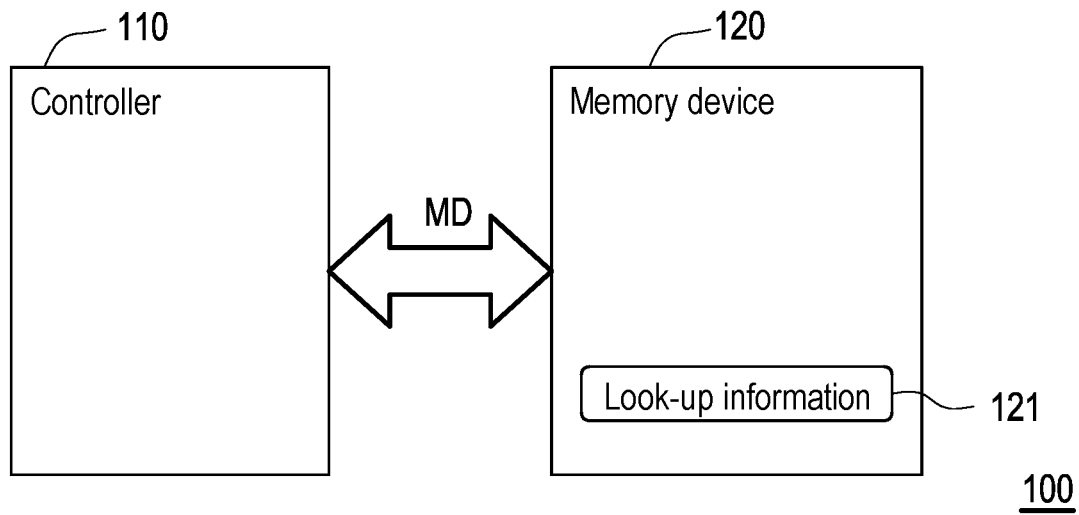
FIG. 1 and FIG. 4 are schematic diagrams of an electronic device according to different embodiments of the disclosure.

Please refer to FIG. 1, which is a schematic diagram of an electronic device according to an embodiment of the disclosure. An electronic device 100 includes a controller 110 and a memory device 120. The controller 110 is coupled to the memory device 120. Receiving and sending actions of transmission data are performed between the controller 110 and the memory device 120. When the controller 110 transmits the transmission data to the memory device 120, the controller 110 may preset dummy data. The dummy data has multiple dummy bits. In addition, the controller 110 may insert the dummy bits of the dummy data into the transmission data according to an insertion type, thereby generating encryption data MD. Furthermore, the controller 110 may transmit the encryption data MD to the memory device 120.

On the other hand, after receiving the encryption data MD, the memory device 120 may obtain the dummy data according to the insertion type based on look-up information 121. Here, the insertion type applied by the controller 110 to generate the encryption data MD may correspond to insertion type information, and the insertion type information may be preset in the memory device 120. In addition, the look-up information 121 may also be pre-stored in the memory device 120. Therefore, after receiving the encryption data MD, the memory device 120 may perform a look-up action on the look-up information 121 according to the insertion type information, so as to obtain the insertion type used by the controller 110 and the dummy data in the encryption data MD. Then, the memory device 120 may remove the dummy bits in the dummy data from the encryption data MD according to the insertion type, and restore the transmission data. In this way, the memory device 120 may perform a storing action of the transmission data.

In the embodiment, the memory device 120 may be a programmable non-volatile memory, such as a flash memory, a resistive memory, a magnetoresistive memory, a phase change memory, or a ferroelectric memory. The memory device 120 may also be a volatile memory, such as dynamic random access memory or a static random access memory. In addition, the memory device 120 may use a memory for storing the transmission data to store the look-up information 121. Alternatively, the look-up information 121 may also be stored in a memory different from the memory for storing the transmission data, which is not limited thereto.

Incidentally, the look-up information 121 in the embodiment may be dynamically adjusted. The controller 110 may adjust the applied insertion type and the correspondingly inserted dummy data. After the adjustment, the controller 110 may update the look-up information 121 in the memory device 120. The updating action of the look-up information 121 may be periodically executed to improve the security of the encryption data.

The controller 110 of the disclosure may be a processor having computing capability. Alternatively, the controller 110 may be a hardware circuit that is designed through a hardware description language (HDL) or any other digital circuit design manner well known to persons skilled in the art, and implemented through a field programmable logic gate array (FPGA), a complex programmable logic device (CPLD), or an application-specific integrated circuit (ASIC).

Figure 2A:
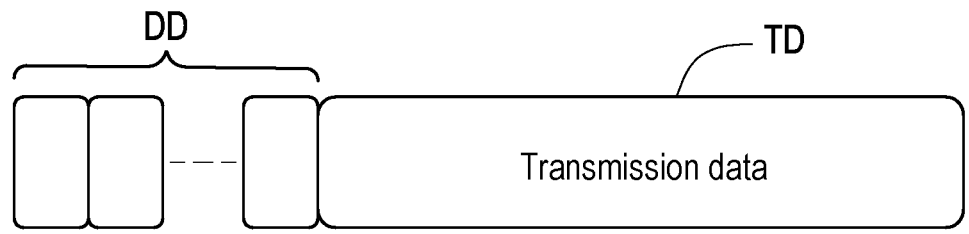
FIG. 2A to FIG. 2D are schematic diagrams of generation manners of multiple encryption data according to an embodiment of the disclosure.

Regarding types of the insertion type, please refer to FIG. 2A to FIG. 2D, which are schematic diagrams of generation manners of multiple encryption data according to an embodiment of the disclosure. In FIG. 2A, encryption data 201 is generated by performing front insertion on dummy data DD for transmission data TD. Multiple bits of the dummy data DD are inserted into the position of a front side (for example, the side of the least significant bit) of the transmission data TD. The number of dummy bits of the dummy data DD may be greater than, equal to, or less than the number of bits of the transmission data TD, which is not limited thereto.

Figure 2B:
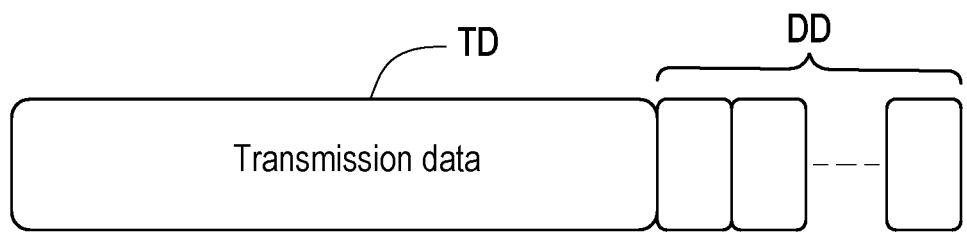

In FIG. 2B, encryption data 202 is generated by performing end insertion on dummy data DD for transmission data TD. Multiple bits of the dummy data DD are inserted into the position of an end side (for example, the side of the most significant bit) of the transmission data TD. Likewise, the number of dummy bits of the dummy data DD may be greater than, equal to, or less than the number of bits of the transmission data TD, which is not limited thereto.

Figure 2C:
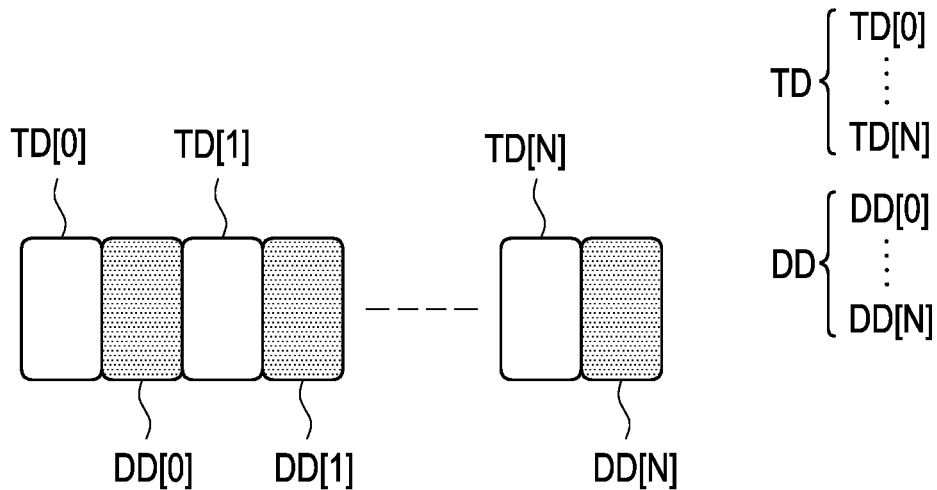

In FIG. 2C, encryption data 203 is generated by performing interleaving insertion on multiple dummy bits DD[0] to DD[N] of dummy data DD for transmission data TD. In the embodiment, the transmission data TD has multiple bits TD[0] to TD[N]. A first bit, the dummy bit DD[0], of the dummy data DD is inserted between the bits TD[0] and TD[1] of the transmission data TD. Multiple subsequent dummy bits DD[1] to DD[N] of the dummy data DD may be respectively inserted between two adjacent bits of the transmission data TD in sequence. In this way, the similarity between the encryption data 203 and the transmission data TD can be effectively reduced.

Figure 2D:
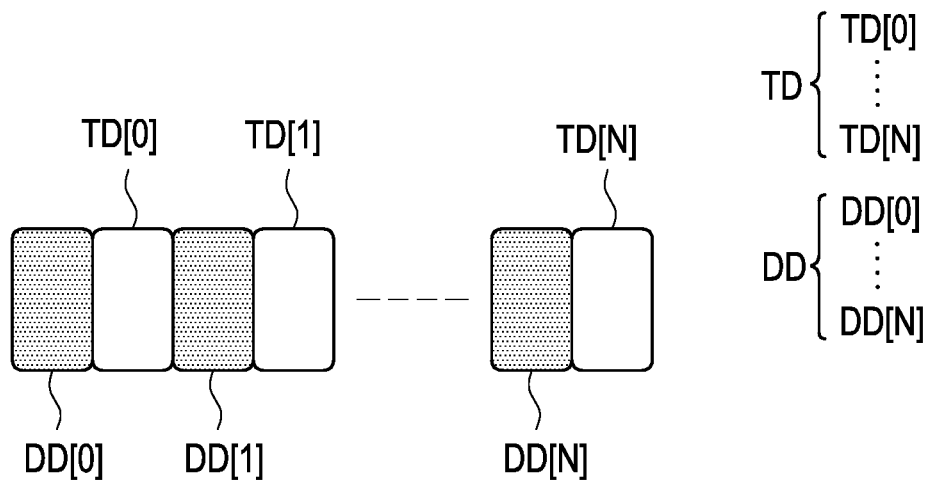

In FIG. 2D, encryption data 204 is also generated by performing interleaving insertion on multiple dummy bits DD[0] to DD[N] of dummy data DD for transmission data TD. In the embodiment, a first bit (the dummy bit DD[0]) of the dummy data DD is inserted before a bit TD[0] of the transmission data TD, and multiple subsequent dummy bits DD[1] to DD[N] of the dummy data DD may be respectively inserted between two adjacent bits of the transmission data TD in sequence. Likewise, such inserting action can also effectively reduce the similarity between the encryption data 204 and the transmission data TD.

Please note that in the embodiment of FIG. 2C and FIG. 2D, only one dummy bit is inserted between two adjacent bits of the transmission data TD. In other embodiments of the disclosure, more than one dummy bit may be inserted between two adjacent bits of the transmission data TD, which is not limited thereto. In addition, the number of dummy bits inserted between any two adjacent bits in the transmission data TD may be the same or different, which is not limited thereto.

It is worth mentioning that the front insertion, the end insertion, and the interleaving insertion of the embodiments of the disclosure may be applied to the generating action of the encryption data individually or in combination. For example, the controller may insert the dummy bits of a first part of the dummy data into the transmission data by the front insertion; insert the dummy bits of a second part of the dummy data into the transmission data by the end insertion; and insert the dummy bits of a third part of the dummy data into the transmission data by the interleaving insertion. In this way, the complexity of the encryption data can be greatly increased.

Figure 3:
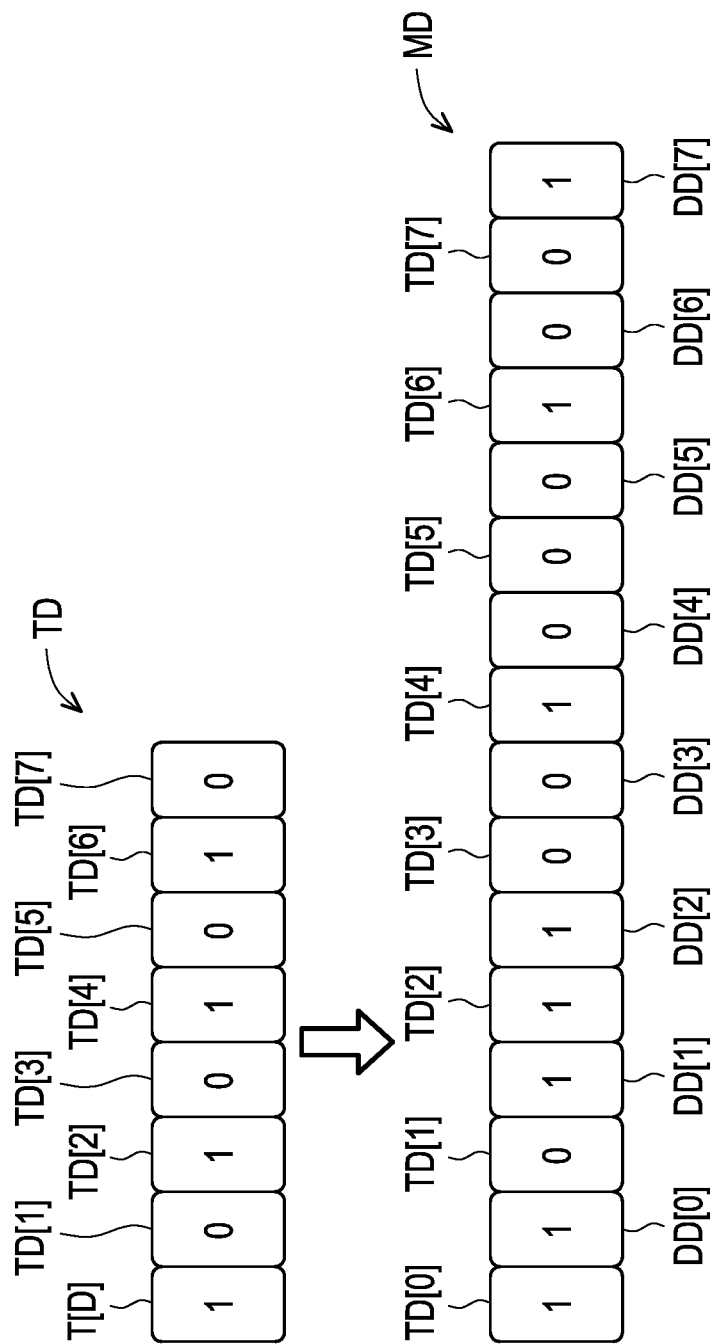
FIG. 3 is a schematic diagram of an implementation of a generation manner of encryption data of an electronic device according to an embodiment of the disclosure.

Hereinafter, reference may be made to FIG. 3, which is a schematic diagram of an implementation of a generation manner of encryption data of an electronic device according to an embodiment of the disclosure. In the embodiment of FIG. 3, transmission data has, for example, eight bits TD[0] to TD[7]. Logical values of the bits TD[0] to TD[7] are respectively, for example, 1, 0, 1, 0, 1, 0, 1, and 0. Dummy data also has eight dummy bits DD[0] to DD[7]. Logical values of the dummy bits DD[0] to DD[7] are respectively, for example, 1, 1, 1, 0, 0, 0, 0, and 1. Here, the controller may respectively insert the dummy bits DD[0] to DD[7] of the dummy data into the eight bits TD[0] to TD[7] of the transmission data by interleaving insertion according to an insertion type of the interleaving insertion, so that generated encryption data MD has 16 bits, wherein logical values are respectively 1, 1, 0, 1, 1, 1, 0, 0, 1, 0, 0, 0, 1, 0, 0, and 1.

In the embodiment, the logical values of the bits TD[0] to TD[7] of the transmission data and the dummy bits DD[0] to DD[7] are just examples for illustration. The logical values of the bits TD[0] to TD[7] of the transmission data and the dummy bits DD[0] to DD[7] may be any value without limitation.

It can be known from the above description that through the inserting action of the dummy data into the transmission data, there may be a considerable degree of difference between the transmission data and the transmitted encryption data MD. Therefore, it can be ensured that the transmission data will not be easily stolen by others during a transmission process, and the security of the transmission data can be ensured.

Figure 4:
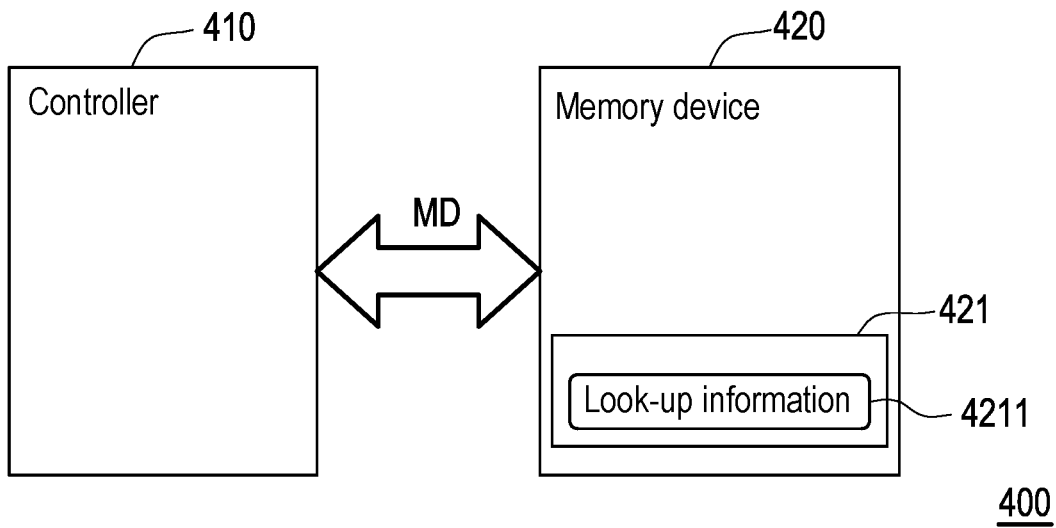

Please refer to FIG. 4, which is a schematic diagram of an electronic device according to another embodiment of the disclosure. An electronic device 400 includes a controller 410 and a memory device 420. The encryption and transmission manners of transmission data of the embodiment are the same as those in the embodiment of FIG. 1, and details are not described here. Different from the embodiment of FIG. 1, a look-up table 421 is disposed in the memory device 420. The look-up table 421 is used to store look-up information 4211. Here, the look-up table 421 may be any form of memory. The look-up information 4211 in the look-up table 421 may be written by the controller 410. The controller 410 may dynamically adjust the look-up information 4211 in the look-up table 421 when required. The security of the transmission data can be effectively improved.

Figure 5:
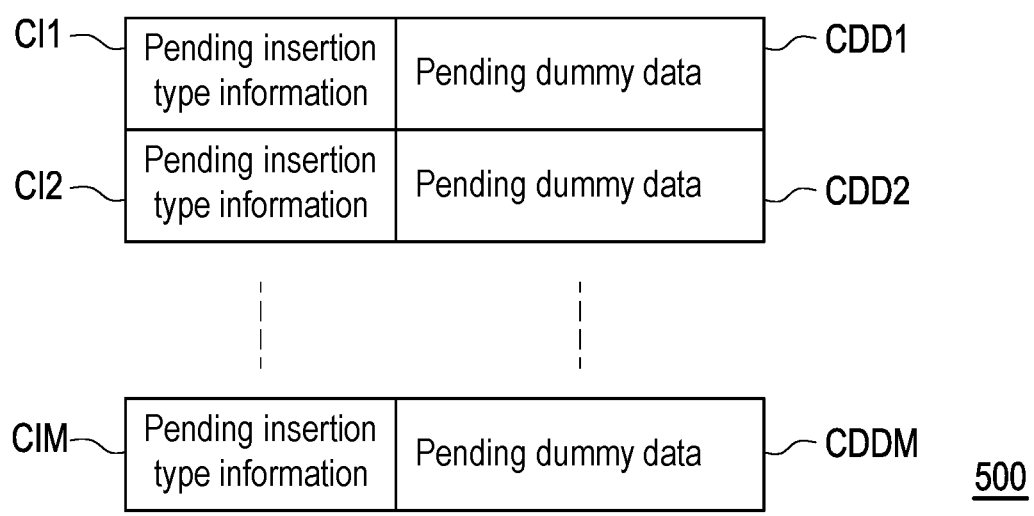
FIG. 5 is a schematic diagram of look-up information according to an embodiment of the disclosure.

Please refer to FIG. 5, which is a schematic diagram of look-up information according to an embodiment of the disclosure. Look-up information 500 includes multiple pending insertion type information CI1 to CIM and multiple corresponding pending dummy data CDD1 to CDDM. Each of the pending insertion type information CI1 to CIM may be a digital value having one or more bits. Each of the pending dummy data CDD1 to CDDM may be a digital value having multiple bits. When a look-up action is executed, the received insertion type information may be compared with the pending insertion type information CI1 to CIM, and the pending insertion type information (for example, the pending insertion type information CI1) that is the same as the input insertion type information is found. Then, the memory device may output the pending dummy data CDD1 corresponding to the pending insertion type information CI1, and execute a restoring action of the transmission data accordingly.

Figure 6:
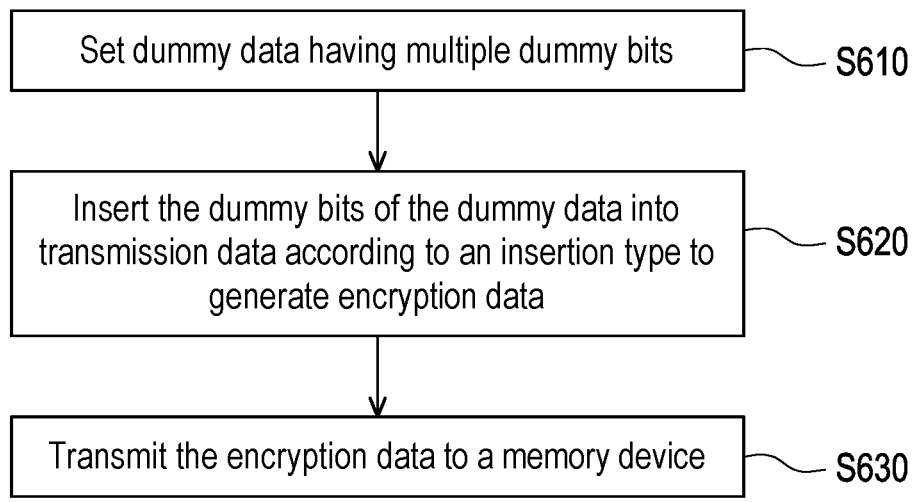
FIG. 6 is a flowchart of a data transmission action according to an embodiment of the disclosure.

Please refer to FIG. 6, which is a flowchart of a data transmission action according to an embodiment of the disclosure. In Step S610, a controller may set dummy data having multiple dummy bits. Moreover, in Step S620, the controller may insert the dummy bits of the dummy data into transmission data according to an insertion type to generate encryption data. Also, in Step S630, the controller may transmit the encryption data to a memory device.

The implementation details of the above Steps S610 to S630 have been described in detail in the foregoing embodiments and implementation manners, and will not be described in detail below.

In addition, in the embodiment of the disclosure, the memory device may obtain the dummy data according to the insertion type applied by the controller based on the look-up information. The memory device may remove the dummy bits from the encryption data according to the insertion type and restore the transmission data. The details of the action of restoring the transmission data by the memory device are also described in detail in the foregoing embodiments and implementation manners, and will not be described in detail below.

In summary, in the electronic device of the disclosure, the controller inserts the dummy data into the transmission data according to the insertion type to generate the encryption data. The encryption data is transmitted to the memory device. In this way, the encryption data can be prevented from being stolen by others to effectively maintain the security of the transmission data. In addition, the data inserting action adopted by the electronic device of the disclosure does not require a complicated algorithm, which can effectively reduce the complexity of hardware and power consumption. On the other hand, the memory device in the embodiments of the disclosure looks up the dummy data inserted in the encryption data and the inserted position according to the insertion type. In this way, the memory device may remove the dummy bits for the encryption data and restore the transmission data. The correct transmission data can be effectively obtained without applying a complex algorithm.

What is claimed is:

1. A data transmission method, comprising:
    setting dummy data having a plurality of dummy bits;
    inserting the dummy bits of the dummy data into transmission data according to an insertion type to generate encryption data; and
    transmitting the encryption data to a memory device,
    wherein the insertion type comprises front insertion, end insertion, and interleaving insertion.

2. The data transmission method according to claim 1, further comprising:
    obtaining, by the memory device, the dummy data according to the insertion type based on look-up information; and
    removing, by the memory device, the dummy bits from the encryption data according to the insertion type and restoring the transmission data.

3. The data transmission method according to claim 1, wherein if the insertion type is the interleaving insertion, inserting each of the dummy bits into two adjacent bits of the transmission data.

4. The data transmission method according to claim 1, wherein if the insertion type is the front insertion, inserting all of the dummy bits into a position in front of a least significant bit of the transmission data.

5. The data transmission method according to claim 1, wherein if the insertion type is the end insertion, inserting all of the dummy bits into a position back of a most significant bit of the transmission data.

6. The data transmission method according to claim 1, further comprising:
    providing insertion type information to the memory device; and
    obtaining, by the memory device, the insertion type according to the insertion type information.

7. The data transmission method according to claim 1, further comprising:
    disposing a look-up table in the memory device to store the look-up information, wherein the look-up information comprises a plurality of pending insertion type information and a plurality of corresponding pending dummy data.

8. The data transmission method according to claim 7, further comprising:
    updating the look-up information periodically.

9. The data transmission method according to claim 1, wherein a bit number of the dummy bits is greater than, smaller than or equal to a bit number of the transmission data.

10. An electronic device, comprising:
    a memory device; and
    a controller, coupled to the electronic device, the controller being used to:
        set dummy data having a plurality of dummy bits;
        insert the dummy bits of the dummy data into transmission data according to an insertion type to generate encryption data; and
        transmit the encryption data to the memory device,
        wherein the insertion type comprises front insertion, end insertion, and interleaving insertion.

11. The electronic device according to claim 10, wherein the memory device obtains the dummy data according to the insertion type based on look-up information, and the memory device removes the dummy bits from the encryption data according to the insertion type and restores the transmission data.

12. The electronic device according to claim 10, wherein if the insertion type is the interleaving insertion, the controller inserts each of the dummy bits into two adjacent bits of the transmission data.

13. The electronic device according to claim 10, wherein if the insertion type is the front insertion, the controller inserts all of the dummy bits into a position in front of a least significant bit of the transmission data.

14. The electronic device according to claim 10, wherein if the insertion type is the end insertion, the controller inserts all of the dummy bits into a position back of a most significant bit of the transmission data.

15. The electronic device according to claim 10, wherein the controller further provides insertion type information to the memory device, and the memory device obtains the insertion type according to the insertion type information.

16. The electronic device according to claim 10, further comprising:
    a look-up table, disposed in the memory device, wherein the look-up information comprises a plurality of pending insertion type information and a plurality of corresponding pending dummy data.

17. The electronic device according to claim 16, wherein the look-up information in the look-up table are periodically updated by the controller.

18. The electronic device according to claim 10, wherein a bit number of the dummy bits is greater than, smaller than or equal to a bit number of the transmission data.

* * * * *